(12) United States Patent
Camarda Silva Folco et al.

(10) Patent No.: US 10,108,442 B1
(45) Date of Patent: Oct. 23, 2018

(54) OPTIMIZATION AND AFFINITY FOR HYPERVISOR-BASED JUST-IN-TIME TRANSLATOR

(71) Applicant: International Business Machines Corporation, Armonk, NY (US)

(72) Inventors: Rafael Camarda Silva Folco, Hortolandia (BR); Plinio A. S. Freire, Hortolandia (BR); Breno Henrique Leitao, Hortolandia (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/706,891

(22) Filed: Sep. 18, 2017

(51) Int. Cl.
*G06F 8/41* (2018.01)
*G06F 9/455* (2018.01)

(52) U.S. Cl.
CPC ............ *G06F 9/4552* (2013.01); *G06F 8/443* (2013.01); *G06F 9/45558* (2013.01)

(58) Field of Classification Search
None
See application file for complete search history.

(56) References Cited

U.S. PATENT DOCUMENTS

| | | | | |
|---|---|---|---|---|
| 7,490,320 B2* | 2/2009 | Kielstra | .............. | G06F 9/45516 717/118 |
| 8,677,329 B2* | 3/2014 | Beretta | ................. | G06F 9/5055 714/E11.209 |
| 9,183,018 B2* | 11/2015 | Jennings | ................ | G06F 9/4552 |
| 2003/0070161 A1* | 4/2003 | Wong | ....................... | G06F 8/443 717/148 |
| 2003/0131147 A1* | 7/2003 | Wilt | ........................ | G06F 8/447 719/321 |

(Continued)

OTHER PUBLICATIONS

Vandercammen et al., Improving Trace-Based JIT Optimisation Using Whole-Program Information, Retrieved from Internet: URL: http://soft.vub.ac.be/Publications/2016/vub-soft-tr-16-09.pdf, 8 pages.

(Continued)

*Primary Examiner* — Isaac T Tecklu
(74) *Attorney, Agent, or Firm* — Schmeiser, Olsen & Watts, LLP; Mark Vallone

(57) ABSTRACT

Systems and methods improve performance and resource-efficiency of Just-in-Time (JIT) compilation in a hypervisor-based virtualized computing environment. A user attempts to launch an application that has been previously compiled by a JIT compiler into an intermediate, platform-independent format. A JIT accelerator selects a unique function signature that identifies the application and the user's target platform. If the signature cannot be found in a repository, indicating that the application has never been run on the target platform, the accelerator generates and stores the requested executable program in shared memory and saves the signature in the repository. The system then returns to the user a pointer to the stored platform-specific executable. If multiple users of the same platform request the same application, the system recognizes an affinity among those requests identified by their shared signature, and provides each user a pointer to the same previously stored, shared executable.

20 Claims, 6 Drawing Sheets

(56) References Cited

U.S. PATENT DOCUMENTS

| | | | |
|---|---|---|---|
| 2005/0240914 A1* | 10/2005 | Anderson | G06F 9/45516 717/148 |
| 2006/0101426 A1* | 5/2006 | Ioku | G06F 1/3203 717/136 |
| 2007/0061787 A1* | 3/2007 | Trowbridge | G06F 8/44 717/140 |
| 2010/0115501 A1* | 5/2010 | Partridge | G06F 9/4552 717/148 |
| 2010/0191930 A1* | 7/2010 | Groff | G06F 8/44 711/170 |
| 2013/0159983 A1* | 6/2013 | Barsness | G06F 8/41 717/148 |
| 2013/0262820 A1* | 10/2013 | Rieschl | G06F 11/3476 712/200 |
| 2014/0007060 A1* | 1/2014 | Warren | G06F 8/437 717/148 |
| 2015/0178104 A1* | 6/2015 | Venkatasubramanian | G06F 9/44589 717/126 |
| 2015/0186167 A1* | 7/2015 | Jennings | G06F 9/45508 717/148 |
| 2015/0186170 A1* | 7/2015 | Jennings | G06F 9/45516 717/148 |
| 2015/0205588 A1* | 7/2015 | Bates | G06F 9/4552 717/145 |
| 2015/0378694 A1* | 12/2015 | Lagergren | G06F 8/437 717/143 |

OTHER PUBLICATIONS

Suganuma, et al., A Dynamic Optimization Framework for a Java Just-In-Time Compiler, Rretrieved from Internet: URL: http://dl.acm.org/citation.cfm?id=504296, Copyright ACM 2001 1-58113-335, Sep. 1, 2010, pp. 180-194.

* cited by examiner

OPTIMIZATION AND AFFINITY FOR HYPERVISOR-BASED JUST-IN-TIME TRANSLATOR

BACKGROUND

The present invention relates generally to software execution in a multi-user computing environment and in particular to improving the operation of Just-in-Time (JIT) compilation of cloud-based applications.

In computer science, a conventional programming-language compiler compiles source code into an executable computer program or program "runtime." Instances of the executable program may then be launched in compatible computing environments, and each launched instance consumes an amount of computer memory.

A Just-in-Time Translator is a special type of compiler that only partially compiles code into an intermediate form sometimes referred to as "bytecode" or "p-code." JIT compilation completes when an instance of the program is launched, at "runtime." At actual runtime, when the program is to be run by a user, the intermediate code is translated into computer-executable machine code on the fly.

JIT compilation and subsequent translation may be more efficient at the time of initial bytecode compilation because the initial compilation defers the time-consuming process of full compilation to executable code until runtime. JIT compilation may also reduce the amount of required disk space because the intermediate bytecode form of an application is generally smaller than its corresponding fully compiled executable.

But JIT translation also requires greater computational resources and may reduce performance at runtime because a JIT translator must perform time-consuming translation tasks at runtime. In addition to interactively translating intermediate bytecode into machine language that is specific to a particular computing environment, JIT translation may also comprise loading large runtime modules from libraries in order to generate an executable program capable of being run in a particular computing environment.

For example, launching a JIT-compiled application a user environment based on the .NET framework may comprise translating a previously compiled bytecode version of the application into an executable that comprises .NET runtime libraries and launching the application on an open-source HHVM (HipHop Virtual Machine) platform may comprise translating same the bytecode into an executable that comprises PHP library routines. Similarly, launching the application on a Pypy platform may comprise translating the bytecode into an executable program that comprises Python runtime-library modules.

Furthermore, JIT compilation may not reduce the amount of memory required to run multiple instances of a compiled program. If two instances of a JIT-compiled program (each running in either the same or in different containers, dedicated user-specific operating environments, or virtual machines) run similar workloads and are compiled with the same libraries, both instances will at runtime be translated into the same native assembly code and will thus consume the same amount of memory.

Similarly, if a third instance then launches, that new instance will require its own copy of the executable program, even if a similar JIT-translated instance has already been provisioned in the same environment. Therefore, regardless of whether a program is compiled by a conventional compiler or by a JIT compiler, launching five instances of the program, even in the same operating environment, may consume five times the memory required by a single instance. Furthermore, in such a case, JIT translation would require five resource-intensive JITT translation tasks to be run concurrently.

SUMMARY

An embodiment of the present invention provides a cloud-based JIT-translation system comprising a processor, a memory coupled to the processor, and a computer-readable hardware storage device coupled to the processor, the storage device containing program code configured to be run by the processor via the memory to implement a method for optimization and affinity for hypervisor-based just-in-time translation, the method comprising:

the system receiving, from a first user, a first request to launch a user application from a first virtualized operating platform;

the system identifying a first function signature of a plurality of function signatures, where the first function signature uniquely identifies the user application and the first virtualized operating platform;

the system determining whether the first function signature is stored in a signature repository and, if determining that the first function signature is not stored in the signature repository:

the system generating a first executable version of the user application that is compatible with the first virtualized operating platform;

the system storing the first executable version in a shared area of memory that is accessible to multiple users; and the system storing the first function signature in the signature repository; and the system returning to the first user a first pointer to a first returned runtime version of the user application, where the first returned runtime version is compatible with the first virtualized operating platform, such that the first user is capable of launching a first distinct instance of the user application from the first virtualized operating platform by using the first pointer to access the first returned runtime version.

Another embodiment of the present invention provides a method for optimization and affinity for hypervisor-based just-in-time translation, the method comprising:

receiving, from a first user, a first request to launch a user application from a first virtualized operating platform;

identifying a first function signature of a plurality of function signatures, where the first function signature uniquely identifies the user application and the first virtualized operating platform;

determining whether the first function signature is stored in a signature repository and, if determining that the first function signature is not stored in the signature repository:

generating a first executable version of the user application that is compatible with the first virtualized operating platform;

storing the first executable version in a shared area of memory that is accessible to multiple users; and storing the first function signature in the signature repository; and returning to the first user a first pointer to a first returned runtime version of the user application, where the first returned runtime version is compatible with the first virtualized operating platform, such that the first user is capable of launching a first distinct instance of the user application from the first virtualized operating platform by using the first pointer to access the first returned runtime version.

Yet another embodiment of the present invention provides a computer program product, comprising a computer-readable hardware storage device having a computer-readable program code stored therein, the program code configured to be executed by a cloud-based JIT-translation system comprising a processor, a memory coupled to the processor, and a computer-readable hardware storage device coupled to the processor, the storage device containing program code configured to be run by the processor via the memory to implement a method for optimization and affinity for hypervisor-based just-in-time translation, the method comprising:

receiving, from a first user, a first request to launch a user application from a first virtualized operating platform;

identifying a first function signature of a plurality of function signatures, where the first function signature uniquely identifies the user application and the first virtualized operating platform;

determining whether the first function signature is stored in a signature repository and, if determining that the first function signature is not stored in the signature repository:

generating a first executable version of the user application that is compatible with the first virtualized operating platform;

storing the first executable version in a shared area of memory that is accessible to multiple users; and storing the first function signature in the signature repository; and returning to the first user a first pointer to a first returned runtime version of the user application, where the first returned runtime version is compatible with the first virtualized operating platform, such that the first user is capable of launching a first distinct instance of the user application from the first virtualized operating platform by using the first pointer to access the first returned runtime version.

DETAILED DESCRIPTION

Figure 1:
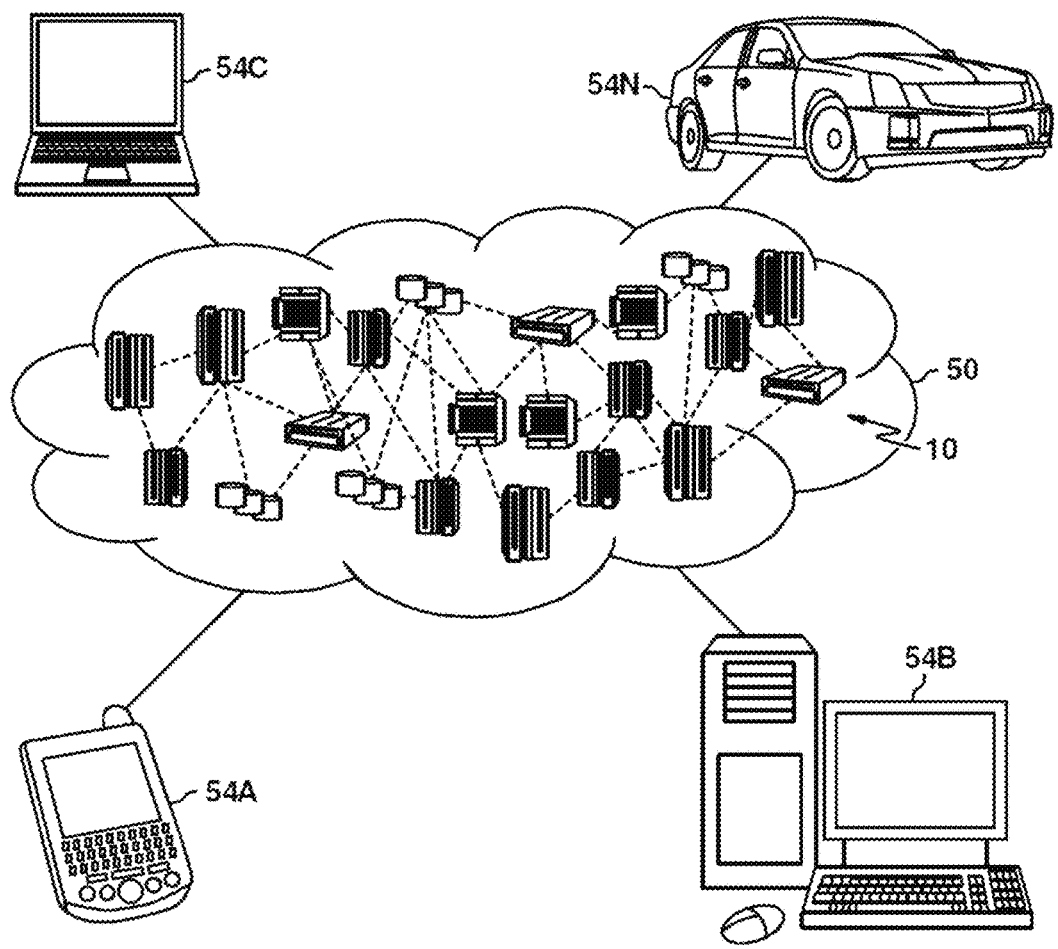
FIG. 1 depicts a cloud computing environment according to an embodiment of the present invention.

Embodiments of the present invention provide a more efficient way of implementing Just-in-Time (JIT) computer-code compilation technology in a cloud-computing environment. Embodiments provide this solution by taking advantage of code-sharing functionality intrinsic to a cloud-computing environment's hypervisor-based cloud-management system.

The present invention is thus a technical improvement to a problem rooted in cloud-computing technology, namely the technical problem of reducing resource consumption and improving system performance when a user requests an executable instance of a previously JIT-compiled program.

Conventional JIT implementations require that a JIT translator must respond to such a request by, at program runtime, translating a file of intermediate bytecode (previously compiled by a JIT compiler) into a new instance of the executable program. Each such new instance must be tailored to the user's particular computing platform by incorporating compatible runtime libraries, such as a library designed for applications running on a PHP, Python, or .NET platform.

Such translation may be time-consuming and may require a large amount of memory and secondary storage because each new instance requested by a user must be stored as a distinct executable program file, even if those instances are identical copies, customized for the same platform.

Embodiments of the present invention implement solutions that enhance conventional JIT compilation technology by incorporating virtualization and code-sharing capabilities of a cloud-computing environment. These enhancements comprise translating a JIT-compiled intermediate bytecode file into a shared executable program customized with runtime libraries compatible with a particular hosted environment, container, or other platform hosted by the cloud-computing hypervisor.

In such embodiments, when a user requests a new executable instance of a program, a hypervisor-hosted JIT "Affinity" Accelerator 509 (JITA) determines whether an shared instance of that executable has already been created for the requested platform. If such a shared executable already exists, the shared file is quickly and efficiently used to satisfy the user's request. If the shared code does not already exist, it is created and stored as a new shared executable. In addition to satisfying the current user request, this new shared file will be available to satisfy future user requests for instances of the same program on the same platform.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
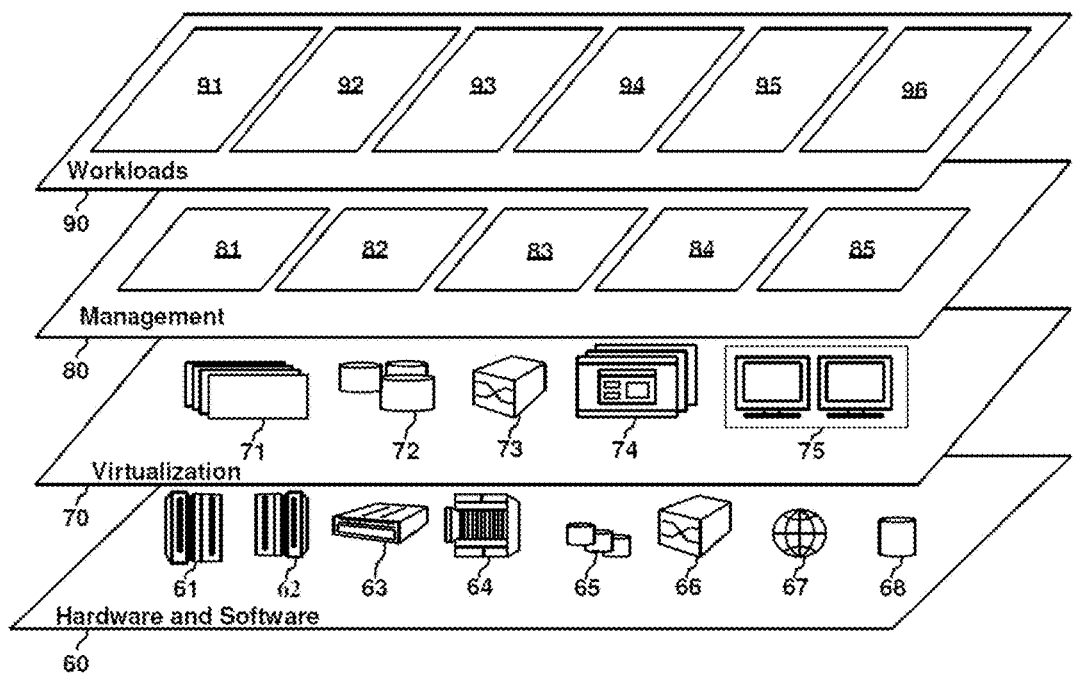
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA, or orchestration of optimization and affinity for hypervisor-based just-in-time translation.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimization and affinity for hypervisor-based just-in-time translation 96.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
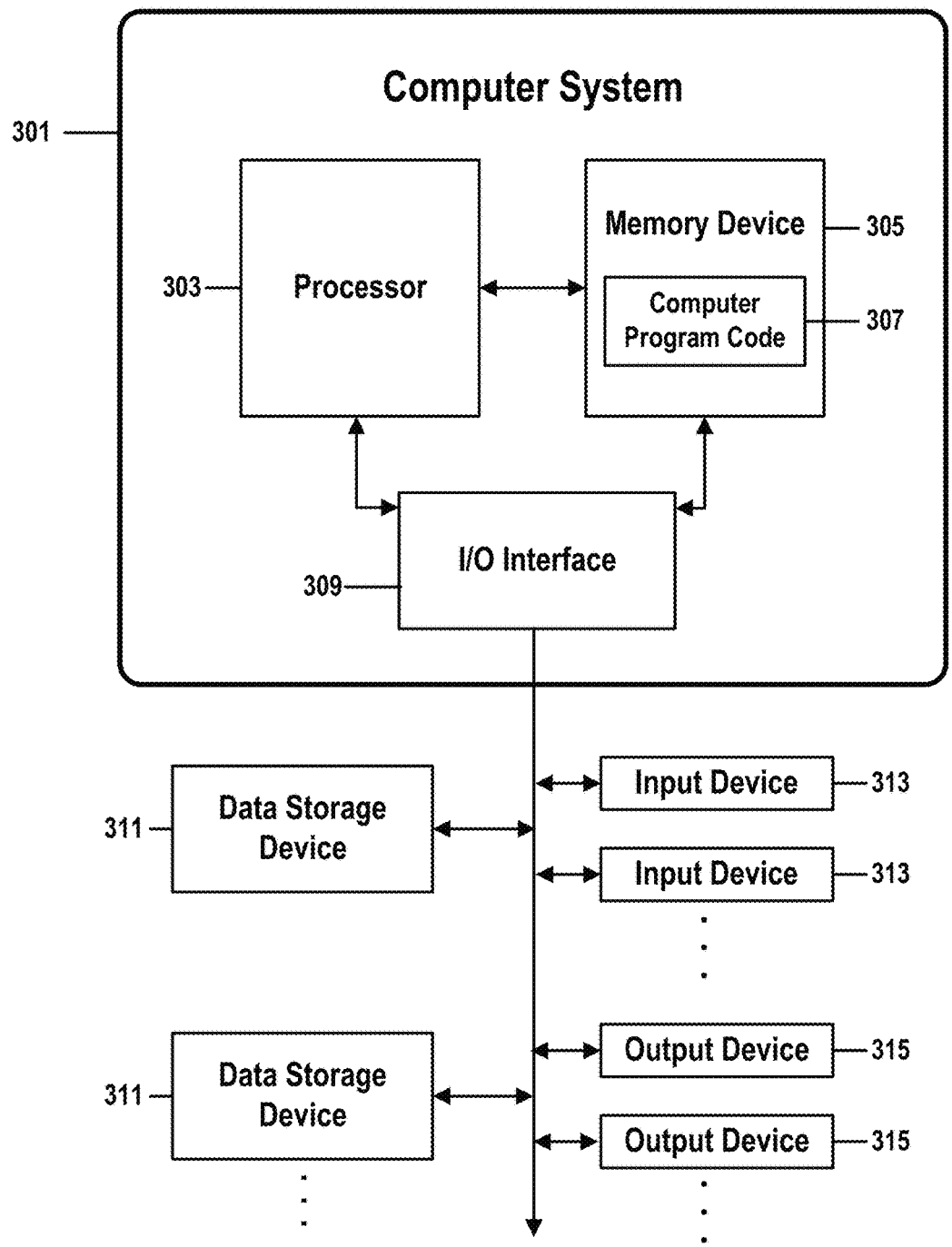
FIG. 3 shows the structure of a computer system and computer program code that may be used to implement a method for optimization and affinity for hypervisor-based just-in-time translation in accordance with embodiments of the present invention.

FIG. 3 shows a structure of a computer system and computer program code that may be used to implement a method for optimization and affinity for hypervisor-based just-in-time translation in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for optimization and affinity for hypervisor-based just-in-time translation in accordance with embodiments of the present invention, and may implement other embodiments described in this specification, including the methods illustrated in FIGS. 1-6. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for optimization and affinity for hypervisor-based just-in-time translation.

Any of the components of the present invention could be created, integrated, hosted, maintained, deployed, managed, serviced, supported, etc. by a service provider who offers to facilitate a method for optimization and affinity for hypervisor-based just-in-time translation. Thus the present invention discloses a process for deploying or integrating computing infrastructure, comprising integrating computer-readable code into the computer system 301, wherein the code in combination with the computer system 301 is capable of performing a method for optimization and affinity for hypervisor-based just-in-time translation.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

While it is understood that program code 307 for a method for optimization and affinity for hypervisor-based just-in-time translation may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for optimization and affinity for hypervisor-based just-in-time translation is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
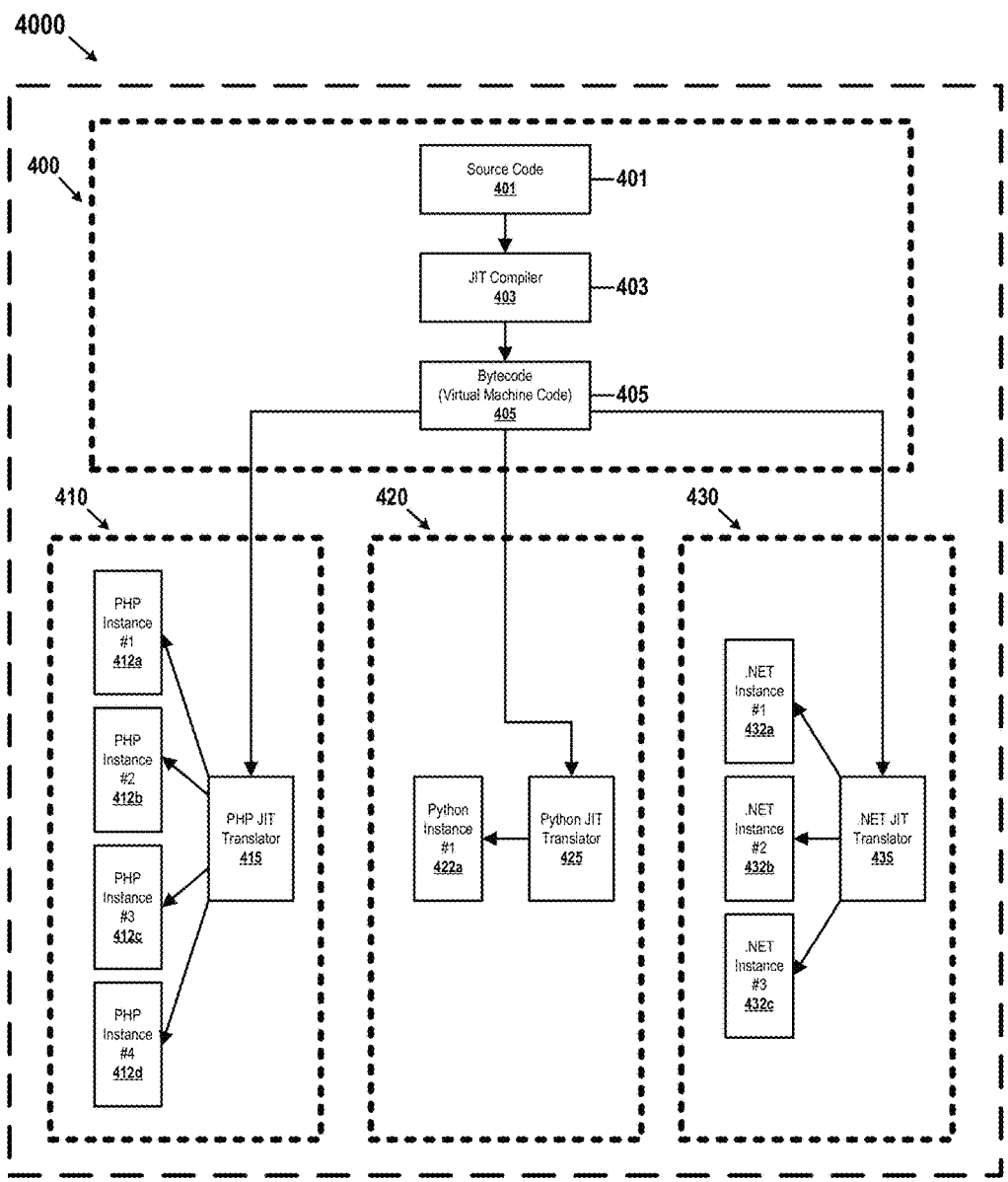
FIG. 4 illustrates an exemplary architecture of JIT-compiler technology in a cloud-computing environment.

FIG. 4 illustrates an exemplary architecture of Just-in-Time compiler technology in a cloud-computing environment 4000. FIG. 4 comprises 400-432*b* and 4000.

In this example, cloud-computing environment 4000 comprises a hypervisor/cloud-management facility 400 that manages three virtualized hosted virtual machines, containers, or other types of virtualized computing environments: a first hosted environment 410 based on a PHP platform, a second hosted environment 420 based on the Python programming language, and a third hosted environment 430 based on the .NET software framework. Other embodiments may comprise a different number of hosted environments that may be based on different platforms; or may be implemented on different types of multi-user environments, such as a non-cloud virtualized computing environment or a non-virtualized multi-user, networked, or distributed enterprise system.

In the cloud-computing example of FIG. 4, a Just-in-Time (JIT) compiler application 403 runs under the control of the cloud environment's hypervisor. The JIT compiler compiles source code 401 of a user application into a bytecode file 405. Bytecode is a portable, intermediate form of computer instructions that may be run in real-time in a particular computing environment by an interpreter or translator program that has been customized for that particular runtime environment.

In the example of FIG. 4, PHP-compliant translator 415 is capable of running bytecode 405 as an executable program in PHP environment 410, Python-compliant translator 425 is capable of running bytecode 405 as an executable program in Python environment 420, and .NET-compliant translator 435 is capable of running bytecode 405 as an executable program in .NET environment 430.

When a first user in the PHP hosted environment 410 invokes the user application, the hypervisor responds by directing the PHP JIT translator 415 to begin translating or interpreting the bytecode 405. This translation or interpretation process generates a first executable PHP-compliant instance 412*a* of the user application. In some implementations, this executable program comprises machine code and PHP-specific runtime routines, retrieved from a PHP runtime library, that allow the executable program to run in the PHP environment.

Similarly, if a user in the Python environment 420 attempts to launch the user application, the Python JIT translator 425 would generate and run a Python-compliant executable instance 422*a* of the user application within the Python environment 420.

This known type of JIT compilation has several drawbacks. All things equal, interpreting or translating bytecode at runtime requires more system resources and is slower than running a conventional executable file that had previously been fully compiled. Furthermore, if additional users attempt to launch the same application concurrently, additional instances of the executable must each be loaded in distinct areas of memory and must each be translated or interpreted by a distinct process. This occurs even when each instance comprises identical code.

For example, if three other users in PHP environment 410 each run the user application, the PHP JIT translator would create a distinct runtime instance 412*b*, 412*c*, or 412*d* for each of the three requesting users. Each of these instances would consume an independent block of memory and would require an instance of a JIT translator 415 to independently translate or interpret bytecode in real-time in order to perform operations of the user application.

Similarly, if three users in the .NET environment 430 each attempt to launch the user application, the .NET JIT translator 435 would generate and run three .NET-compliant executable instances 432*a*, 432*b*, and 432*c* of the user application within the .NET environment 430. Each of these instances 432*a*-432*c* would consume its own resources, such as system memory, any required secondary storage, and the processing power required to interpret or translate bytecode in real time.

In the example of FIG. 4, JIT compiler 403, user-application source code 401, and user-application byte code 405 are shown as being under the direct control of the cloud-computing environment's hypervisor, but in other examples, a similar JIT compiler may reside in one of the hosted environments 410, 420, and 430. In such a case, the similar JIT compiler may generate bytecode that is specific to, and that resides within, the similar JIT compiler's particular host environment. However, the similar JIT compiler otherwise operates in a manner similar to the manner of JIT compiler 403.

Figure 5:
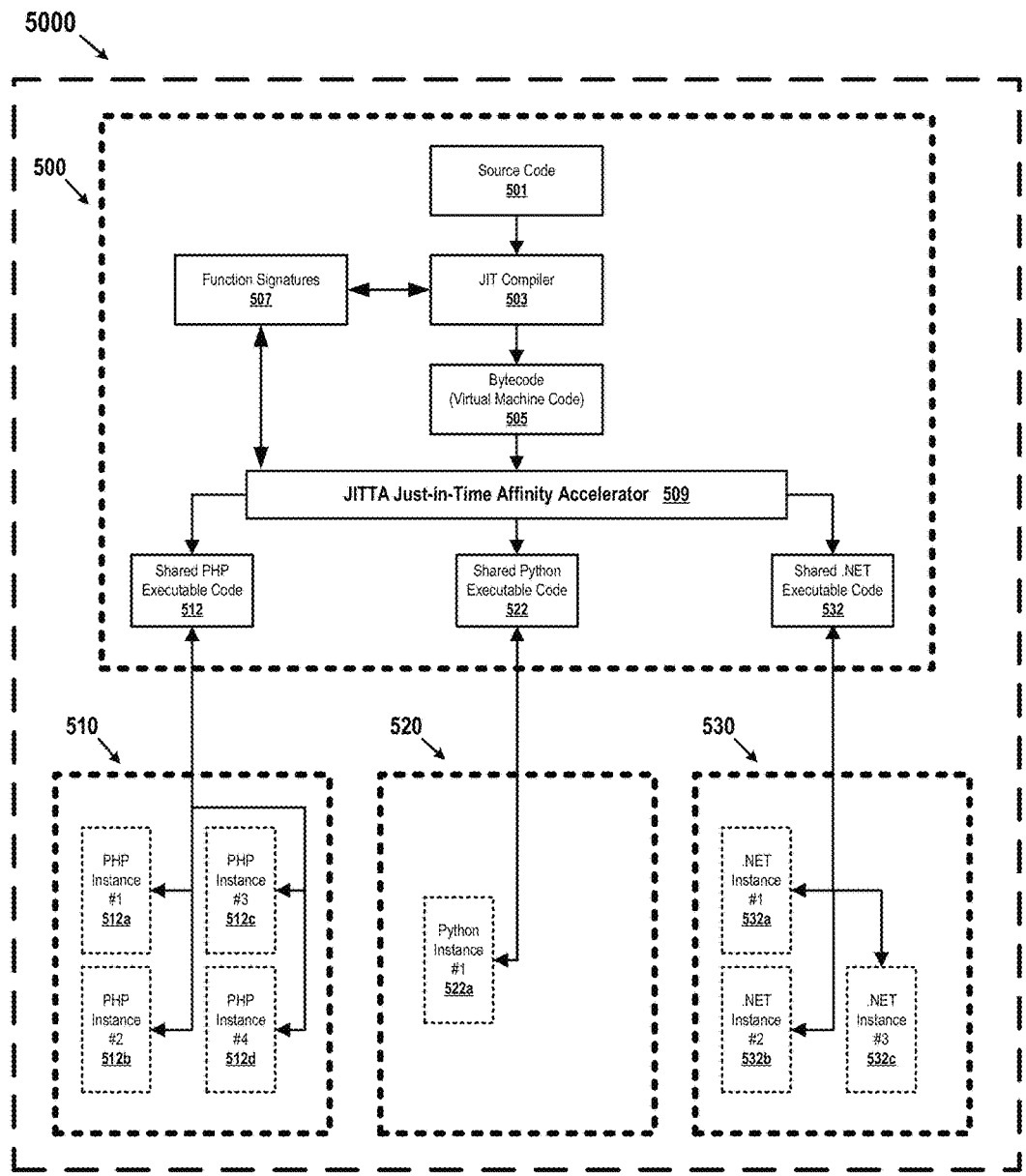
FIG. 5 illustrates an architecture for optimization and affinity for hypervisor-based just-in-time translation, according to an embodiment of the present invention.

FIG. 5 illustrates an architecture for optimization and affinity for hypervisor-based just-in-time translation, according to an embodiment of the present invention. FIG. 5 contains steps 500-532*c* and 5000.

As in FIG. 5, cloud-computing environment 5000 comprises a hypervisor/cloud-management facility 500 that hosts three virtual machines, containers, or other types of virtualized computing environments: a first hosted environment 510 based on a PHP platform, a second hosted environment 520 based on the Python programming language, and a third hosted environment 530 based on the .NET software framework.

Like analogous components of FIG. 4, JIT compiler 503, under hypervisor control, compiles source code 501 of a user application into a bytecode file 505. However, unlike the cloud of FIG. 4, the hypervisor that hosts cloud-management platform 5000 not only caches the compiled bytecode 505, but also caches fully compiled, platform-specific executable versions 512, 522, and 532 of the user application that may be shared with hosted virtual environments 510, 520, and 530. These fully compiled executables 512, 522, and 532 are, respectively, functionally similar to the platform-specific instances 412a-412d, 422a, and 432a-432c of FIG. 4. Embodiments of the present invention thus allow users to bypass a JIT translator 415, 425, or 435 when running a platform-specific executable instance of a JIT-compiled user application.

In the embodiment of FIG. 5, each platform-specific executable version of a user application is identified by a unique function signature that is created the first time the program is launched in a particular platform. These signatures are stored in a shared function signature repository 507 stored in an area of common memory managed by the hypervisor.

If a user attempts to launch the user application on a particular platform, a novel Just-in-Time affinity accelerator 509 searches repository 507 for a copy of the function signature associated with the user application and the user's platform. The existence of such a signature identifies an "affinity" between the requested executable and an already existing platform-specific executable 512, 522, or 532 that had previously been requested and stored in shared memory.

If the signature does not already exist in repository 507, the accelerator 509 knows that a fully compiled executable version of the user application has not yet been generated for the user's particular platform. The accelerator 509 then generates an executable file 512, 522, or 532 that is stored in a shared area of memory accessible to all three hosted platforms 510, 520, and 530.

If the signature already exists in repository 507, the accelerator 509 determines that a fully compiled executable version of the user application has already been generated for the user's platform. In such a case, the accelerator 509 does not create another instance of executable 512, 522, or 532.

Once the accelerator 509 ensures that the requested executable 512, 522, or 532 exists in shared memory, the accelerator 509 returns a pointer to the requested executable 512, 522, or 532. If more than one user requests the same executable 512, 522, or 532, the accelerator 509 recognizes an "affinity" among the requests and returns to each user a pointer to the same requested executable 512, 522, or 532. In this way, the user may run an executable program without incurring the overhead of runtime interpretation or translation, and multiple users may run the same executable program without requiring a distinct copy of the executable, including what may be very large platform-specific libraries, to be created and stored for each user.

For example, if a user attempts to launch a version of the user application that is compatible with Python platform 520, accelerator 509 checks the function signature repository 507 to determine whether a Python-compatible executable 522 of the application already exists in shared memory. If the executable 522 does not already exist, the accelerator 509 creates such an executable program 522 and adds the corresponding function signature to repository 507. The accelerator 509 then returns to the user a pointer to executable code 522 that allows the user to access and run, from the Python platform, a virtual instance 522a of the shared code 522.

Similarly, if four users of the PHP platform 510 attempt to concurrently launch a PHP-compatible version of the user application, accelerator 509 checks the function signature repository 507 to determine whether a PHP-compatible executable 512 of the application already exists in shared memory and, if not, creates a PHP-compatible executable 512. The accelerator 509 then returns to each of the four users a pointer to the executable 512 that allows each user to access and run, from the PHP platform, a virtual instance 512a, 512b, 512c, or 512d of the shared code 512.

Similarly, if three users of the .NET platform 530 attempt to concurrently launch a .NET-compatible version of the user application, accelerator 509 checks the function signature repository 507 to determine whether a .NET-compatible executable 532 of the application already exists in shared memory and, if not, creates a .NET-compatible executable 532. The accelerator 509 then returns to each of the three users a pointer to the executable 532 that allows each user to access and run, from the .NET platform, a virtual instance 532a, 532b, 532c, or 532d of the shared code 532.

Figure 6:
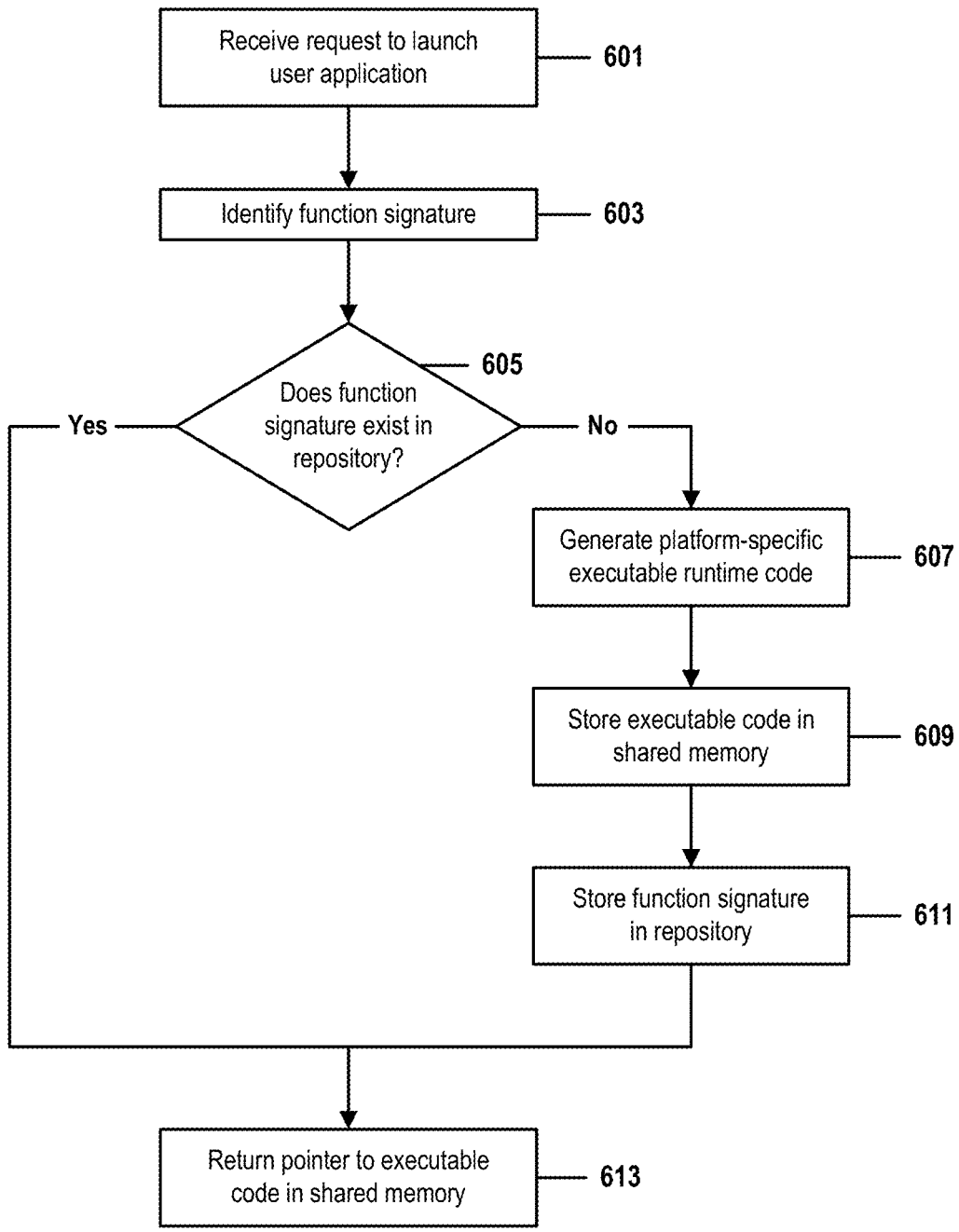
FIG. 6 is a flow chart that illustrates the steps of a method for optimization and affinity for hypervisor-based just-in-time translation, according to embodiments of the present invention.

FIG. 6 is a flow chart that illustrates the steps of a method for optimization and affinity for hypervisor-based just-in-time translation, according to embodiments of the present invention. FIG. 6 contains steps 601-613 which may be performed by embodiments that incorporate architecture analogous that of FIG. 5.

The method of FIG. 6 takes place in a multi-user computing environment in which a JIT compiler 503, enhanced by a novel JIT accelerator module 509, respond to user requests to launch an executable version of a user application.

Such a multi-user environment may be a virtualized platform managed by a hypervisor, such as a system capable of hosting virtual infrastructure and of running applications within virtual machines. The multi-user system may be a virtualized cloud-computing environment, and each user platform 510, 520, or 530 may be a virtualized client platform hosted by a hypervisor and provided to a client as a service of the cloud.

The multi-user system may, in other embodiments, comprise non-virtualized multi-user systems or networked or distributed operating environments, so long as those systems or environments can be by a shared management resource capable of performing functions identified in FIG. 5 as taking place within a shared management facility 500.

Prior to the commencement of the method of FIG. 6, JIT compiler 503 will have compiled user-application source code 501 into an intermediate file 503 of platform-independent bytecode. This bytecode 503 (sometimes referred to as p-code) comprises basic algorithmic steps specified by source code 501, but is not in a machine-readable form capable of running in a particular platform.

Translating the bytecode 503 to a fully executable computer program requires additional steps that translate the bytecode 503 into platform-specific code capable of running on a particular operating environment or platform. This tailoring generally comprises translating the bytecode 503 into platform-specific machine code enhanced with modules retrieved from platform-specific runtime libraries.

Thus, in order to translate the previously compiled bytecode version 503 of the user application into an executable program capable of being run on a requesting user's particular platform, the bytecode version 503 of the user application will first need to be translated into a platform-specific runtime file.

In step 501, an embodiment of a cloud-based JIT-compilation accelerator 509 receives a request from a user to launch the aforementioned user application on the user's particular computing environment or platform.

In step 503, accelerator 509 identifies a function signature that uniquely identifies the user application and user platform. Embodiments of the present invention are flexible enough to accommodate any known means of identifying such a signature desired by an implementer. For example, a signature may be as simple as a four-byte integer variable, where two low-order bytes comprise a number assigned in sequential numerical order to each new requested application, and two high-order bytes comprise a number assigned in sequential numerical order to each user operating environment. In other cases, the accelerator 509 may identify a signature by means of a lookup into a database of all possible signatures. In yet other embodiments, the accelerator 509 may determine a signature by means of a hash function or other computational mechanism that may be based on static characteristics of the application and operating environment, such as a name, a revision number, or an arbitrarily assigned alphanumeric identifier.

In step 605, the system determines whether the signature identified in step 603 has been previously stored in a function signature repository 507. Here, because a signature is stored in repository 507 the first time the system receives from a particular platform a user request for a particular application, determining that the repository 507 does not already store a corresponding signature indicates that no user has in the past requested the same application from a same type of operating environment.

For example, if a user requests that a particular spreadsheet application be launched within a .NET framework, the accelerator 509 will associate a function signature for versions of that application running on a .NET platform, and will attempt to find that signature in repository 507. If the signature cannot be found, the accelerator 509 will assume that no user has ever requested that the same application be run on the same platform as specified in the current request. The accelerator 509 will further assume that the bytecode 505 for the requested application has never been compiled into a platform-specific runtime capable of running on the requesting user's platform.

If the system determines in step 605 that the signature identified in step 603 has not been previously stored in function signature repository 507, the method of FIG. 6 continues with steps 607-611.

In step 607, the accelerator 509 generates an executable runtime version 512, 522, or 532 of the user application that is capable of being run in the requesting user's operating environment. This generating is performed by means described above, by which an intermediate bytecode file 503 is translated into executable machine code and may be further customized by the incorporation of platform-specific code that may be retrieved from platform-specific runtime libraries.

In step 609, the platform-specific runtime executable 512, 522, or 532 is stored by accelerator 509, or by a cloud-management facility, a network-management utility, a hypervisor, or another management entity, into an area of shared memory. This shared executable 512, 522, or 532 will then become accessible to users of user spaces 510, 520, or 530 based on a platform that is compatible with the shared executable 512, 522, or 532.

In step 611, the accelerator 509 (or another management entity or hypervisor) stores the function signature identified in step 603 into the function signature repository 507. Future iterations of the method of FIG. 6, upon finding this function signature in the repository 507, will determine that a platform-specific executable 512, 522, or 532 already exists in shared memory and will not have to be generated again should another user operating on the same platform as the currently requesting user requests the same application requested by the currently requesting user.

In step 613, the accelerator 509 responds to the user request with a pointer to the shared executable 512, 522, or 532. This pointer allows the user to access a platform-specific executable program 512, 522, or 532 tailored to run in the user's specific operating environment 510, 520, or 530. From the user's perspective, an instance 512a-512d, 522a, or 532a-532c of the requested application will be running on the user's platform or in the programming language specified by the user's request. However, the instance 512a-512d, 522a, or 532a-532c will actually be pointing to the shared executable code 512, 522, or 532 and will not require consuming additional memory to create an additional instance specific to the requesting user. Furthermore, because the executable program 512, 522, or 532 will have already been compiled into a form that is native to the user's platform 510, 520, or 530, the executable program 512, 522, or 532 may be run without requiring resource-intensive, performance-degrading real-time runtime translation or interpretation of each instruction.

What is claimed is:

1. A JIT-translation system comprising a processor, a memory coupled to the processor, and a computer-readable hardware storage device coupled to the processor, the storage device containing program code configured to be run by the processor via the memory to implement a method for optimization and affinity for hypervisor-based just-in-time translation, the method comprising:

the system receiving, from a first user, a first request to launch a user application from a first virtualized operating platform;

the system identifying a first function signature of a plurality of function signatures, where the first function signature uniquely identifies the user application and the first virtualized operating platform;

the system determining whether the first function signature is stored in a signature repository and, if determining that the first function signature is not stored in the signature repository:

the system generating a first executable version of the user application that is compatible with the first virtualized operating platform;

the system storing the first executable version in a shared area of memory that is accessible to multiple users; and the system storing the first function signature in the signature repository; and the system returning to the first user a first pointer to a first returned runtime version of the user application, where the first returned runtime version is compatible with the first virtualized operating platform, such that the first user is capable of launching a first distinct instance of the user application from the first virtualized operating platform by using the first pointer to access the first returned runtime version.

2. The system of claim 1, where the first returned runtime version is selected from the group consisting of:
the first executable version; and
a first initial executable version previously generated by the system and stored in the shared area of memory the first time that the system had received a request from any user of the first virtualized operating platform to launch the user application.

3. The system of claim 1, further comprising:
the system receiving from a second user a second request to launch the user application from the first virtualized operating platform, where the second request is received while the first user is still running the first distinct instance of the user application on the first virtualized operating platform;
the system identifying the first function signature;
the system determining that the first function signature is stored in the signature repository; and
the system returning to the second user the first pointer, such that the first user and the second user are each capable of concurrently running a distinct, user-specific instance of the user application from the first virtualized operating platform by each using the first pointer to access the same shared copy of the first returned runtime version.

4. The system of claim 1, where the first returned runtime version consists of platform-specific machine code that is compatible with conventions of the first virtualized operating platform.

5. The system of claim 1, where the first returned runtime version comprises machine code that is imported from a platform-specific runtime library and that conforms to a convention of the first virtualized operating platform.

6. The system of claim 1, further comprising:
the system receiving, from a third user, a third request to launch the user application from a second virtualized operating platform;
the system identifying a second function signature of the plurality of function signatures, where the second function signature uniquely identifies the user application and the second virtualized operating platform;
the system determining whether the second function signature is stored in the signature repository and, if determining that the second function signature is not stored in the signature repository:
the system generating a second executable version of the user application that is compatible with the second virtualized operating platform;
the system storing the second executable version in a shared area of memory that is accessible to multiple users; and
the system storing the second function signature in the signature repository; and
the system returning to the third user a second pointer to a second returned runtime version of the user application,
where the second returned runtime version is compatible with the second virtualized operating platform,
such that the third user is capable of launching a second distinct instance of the user application from the second virtualized operating platform by using the second pointer to access the second returned runtime version, and where the second returned runtime version is selected from the group consisting of:
the second executable version; and
a second initial executable version previously generated by the system and stored in the shared area of memory the first time that the system had received a request from any user of the second virtualized operating platform to launch the user application.

7. The system of claim 6,
where the third request is received while the first user is still running the first distinct instance of the user application in the first virtualized operating platform, and
where the first user and the third user are each capable of concurrently running a distinct, user-specific, platform-specific instance of the user application from the first virtualized operating platform by, respectively, using the first pointer to access the shared copy of the first returned runtime version, and using the second pointer to access the shared copy of the second returned runtime version.

8. A method for optimization and affinity for hypervisor-based just-in-time translation, the method comprising:
receiving, from a first user, a first request to launch a user application from a first virtualized operating platform;
identifying a first function signature of a plurality of function signatures, where the first function signature uniquely identifies the user application and the first virtualized operating platform;
determining whether the first function signature is stored in a signature repository and, if determining that the first function signature is not stored in the signature repository:
generating a first executable version of the user application that is compatible with the first virtualized operating platform;
storing the first executable version in a shared area of memory that is accessible to multiple users; and
storing the first function signature in the signature repository; and
returning to the first user a first pointer to a first returned runtime version of the user application,
where the first returned runtime version is compatible with the first virtualized operating platform, such that the first user is capable of launching a first distinct instance of the user application from the first virtualized operating platform by using the first pointer to access the first returned runtime version.

9. The method of claim 8, where the first returned runtime version is selected from the group consisting of:
the first executable version; and
a first initial executable version previously generated by the system and stored in the shared area of memory the first time that the system had received a request from any user of the first virtualized operating platform to launch the user application.

10. The method of claim 8, further comprising:
receiving from a second user a second request to launch the user application from the first virtualized operating platform, where the second request is received while the first user is still running the first distinct instance of the user application on the first virtualized operating platform;
identifying the first function signature;
determining that the first function signature is stored in the signature repository; and
returning to the second user the first pointer, such that the first user and the second user are each capable of concurrently running a distinct, user-specific instance of the user application from the first virtualized operating platform by each using the first pointer to access the same shared copy of the first returned runtime version.

11. The method of claim 8,
where the first returned runtime version consists of platform-specific machine code that is compatible with conventions of the first virtualized operating platform, and
where the first returned runtime version comprises machine code that is imported from a platform-specific runtime library and that conforms to a convention of the first virtualized operating platform.

12. The method of claim 8, further comprising:
receiving, from a third user, a third request to launch the user application from a second virtualized operating platform;
identifying a second function signature of the plurality of function signatures, where the second function signature uniquely identifies the user application and the second virtualized operating platform;
determining whether the second function signature is stored in the signature repository and, if determining that the second function signature is not stored in the signature repository:
generating a second executable version of the user application that is compatible with the second virtualized operating platform;
storing the second executable version in a shared area of memory that is accessible to multiple users; and
storing the second function signature in the signature repository; and
returning to the third user a second pointer to a second returned runtime version of the user application,
where the second returned runtime version is compatible with the second virtualized operating platform,
such that the third user is capable of launching a second distinct instance of the user application from the second virtualized operating platform by using the second pointer to access the second returned runtime version, and
where the second returned runtime version is selected from the group consisting of:
the second executable version; and
a second initial executable version previously generated by the system and stored in the shared area of memory the first time that the system had received a request from any user of the second virtualized operating platform to launch the user application.

13. The method of claim 12,
where the third request is received while the first user is still running the first distinct instance of the user application in the first virtualized operating platform, and
where the first user and the third user are each capable of concurrently running a distinct, user-specific, platform-specific instance of the user application from the first virtualized operating platform by, respectively, using the first pointer to access the shared copy of the first returned runtime version, and using the second pointer to access the shared copy of the second returned runtime version.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the identifying, the determining, the generating, the storing the first executable version, the storing the first function signature, and the returning.

15. A computer program product, comprising a computer-readable hardware storage device having a computer-readable program code stored therein, the program code configured to be executed by a JIT-translation system comprising a processor, a memory coupled to the processor, and a computer-readable hardware storage device coupled to the processor, the storage device containing program code configured to be run by the processor via the memory to implement a method for optimization and affinity for hypervisor-based just-in-time translation, the method comprising:
receiving, from a first user, a first request to launch a user application from a first virtualized operating platform;
identifying a first function signature of a plurality of function signatures, where the first function signature uniquely identifies the user application and the first virtualized operating platform;
determining whether the first function signature is stored in a signature repository and, if determining that the first function signature is not stored in the signature repository:
generating a first executable version of the user application that is compatible with the first virtualized operating platform;
storing the first executable version in a shared area of memory that is accessible to multiple users; and
storing the first function signature in the signature repository; and
returning to the first user a first pointer to a first returned runtime version of the user application,
where the first returned runtime version is compatible with the first virtualized operating platform, such that the first user is capable of launching a first distinct instance of the user application from the first virtualized operating platform by using the first pointer to access the first returned runtime version.

16. The computer program product of claim 15, where the first returned runtime version is selected from the group consisting of:
the first executable version; and
a first initial executable version previously generated by the system and stored in the shared area of memory the first time that the system had received a request from any user of the first virtualized operating platform to launch the user application.

17. The computer program product of claim 15, further comprising:
receiving from a second user a second request to launch the user application from the first virtualized operating platform, where the second request is received while the first user is still running the first distinct instance of the user application on the first virtualized operating platform;
identifying the first function signature;
determining that the first function signature is stored in the signature repository; and
returning to the second user the first pointer, such that the first user and the second user are each capable of concurrently running a distinct, user-specific instance of the user application from the first virtualized operating platform by each using the first pointer to access the same shared copy of the first returned runtime version.

18. The computer program product of claim 15,
where the first returned runtime version consists of platform-specific machine code that is compatible with conventions of the first virtualized operating platform, and
where the first returned runtime version comprises machine code that is imported from a platform-specific runtime library and that conforms to a convention of the first virtualized operating platform.

19. The computer program product of claim 15, further comprising:
receiving, from a third user, a third request to launch the user application from a second virtualized operating platform;
identifying a second function signature of the plurality of function signatures, where the second function signature uniquely identifies the user application and the second virtualized operating platform;
determining whether the second function signature is stored in the signature repository and, if determining that the second function signature is not stored in the signature repository:
generating a second executable version of the user application that is compatible with the second virtualized operating platform;
storing the second executable version in a shared area of memory that is accessible to multiple users; and
storing the second function signature in the signature repository; and
returning to the third user a second pointer to a second returned runtime version of the user application,
where the second returned runtime version is compatible with the second virtualized operating platform,
such that the third user is capable of launching a second distinct instance of the user application from the second virtualized operating platform by using the second pointer to access the second returned runtime version, and
where the second returned runtime version is selected from the group consisting of:
the second executable version; and
a second initial executable version previously generated by the system and stored in the shared area of memory the first time that the system had received a request from any user of the second virtualized operating platform to launch the user application.

20. The computer program product of claim 19,
where the third request is received while the first user is still running the first distinct instance of the user application in the first virtualized operating platform, and
where the first user and the third user are each capable of concurrently running a distinct, user-specific, platform-specific instance of the user application from the first virtualized operating platform by, respectively, using the first pointer to access the shared copy of the first returned runtime version, and using the second pointer to access the shared copy of the second returned runtime version.

\* \* \* \* \*